United States Patent
Lin et al.

(10) Patent No.: US 7,052,325 B2
(45) Date of Patent: May 30, 2006

(54) STRUCTURE FOR ALL-IN-ONE MEMORY CARD SOCKET

(75) Inventors: Tseng-Shyang Lin, Taipei (TW); Ching-Yi Yeh, Taipei (TW); Fu-Ching Wang, Taipei (TW)

(73) Assignee: Northstar Systems Corp., Taipei (TW)

( * ) Notice: Subject to any disclaimer, the term of this patent is extended or adjusted under 35 U.S.C. 154(b) by 0 days.

(21) Appl. No.: 10/941,917

(22) Filed: Sep. 16, 2004

(65) Prior Publication Data

US 2006/0057891 A1   Mar. 16, 2006

(51) Int. Cl.
*H01R 24/00* (2006.01)
(52) U.S. Cl. .................................. 439/630; 235/441
(58) Field of Classification Search ................ 439/630; 235/441
See application file for complete search history.

(56) References Cited

U.S. PATENT DOCUMENTS

| | | | | |
|---|---|---|---|---|
| 3,934,120 A | * | 1/1976 | Maymarev | ................ 235/441 |
| 5,012,078 A | * | 4/1991 | Pernet | ..................... 235/441 |
| 6,015,311 A | * | 1/2000 | Benjamin et al. | .......... 439/267 |

\* cited by examiner

*Primary Examiner*—Javaid H. Nasri
(74) *Attorney, Agent, or Firm*—Bacon & Thomas, PLLC

(57) ABSTRACT

An all-in-one memory card reader includes a socket into which can be inserted memory cards having more than one distinct specification. A pivot base and a blocking slide are provided at the contact tips of connecting terminals welded on the base board, such that the contact tips of layered connecting terminals are able to be pressed down. Consequently, when a distinct specification memory card is inserted, the contact tips are pressed down to prevent the mis-touch and wear-out of the memory cards' terminals.

5 Claims, 4 Drawing Sheets

US 7,052,325 B2

STRUCTURE FOR ALL-IN-ONE MEMORY CARD SOCKET

BACKGROUND OF THE INVENTION (a) Field of the Invention

The present invention is a novel structure for an all-in-one memory card socket. Specifically, it is a socket to accommodate the insertion of distinct specification memory cards. Inside of the socket, a slide structure is provided, which utilizes the driving force of displacement to generate the operation of pressing down such that the contact tips of layered connecting terminals are able to be pressed down to prevent mis-touch and wear-out of the terminals of distinct specification memory cards.

(b) Description of the Prior Art

As the manufacturers of memory cards have individually developed distinct specification flash memory cards, the interface of a card reader should provide distinct specification connectors to satisfy the need. Thus, a card reader to accept the insertion of multiple cards is introduced to solve the problem of distinct specification memory cards. To scale down the size of a multiple-card reader, the designers tend to provide an insertion hole to accept distinct specification memory cards. However, with the mechanism of sharing one insertion hole, to correctly discriminate the specification of distinct memory card being inserted has become an important issue.

Memory cards of different specifications can be discriminated by shape, thickness, width, depth (length), and contact terminals. Currently, the socket of a memory card typically distinguishes specifications by utilizing the start-up terminals to tell between the locations of insertion as well as the design of insertion tracks or the amount of connecting terminals. However, to meet the mechanism of multiple cards sharing one insertion hole, the connecting terminals typically have to be arranged in a layered style. Under such a condition, if the thicknesses of memory cards are conformable or approximate, the contact terminals are liable to mis-touch the memory card during card insertion. As the power of memory card is supplied from the main unit side, there is current flow in between connecting terminals. Once a mis-touch condition happens, the memory card or main unit side will be short circuited and destroyed.

In view of this problem, the inventor provides a pivot base and structure of a slide, and utilizes the driving force of displacement as a memory card is inserted to press down the structure of the slide, such that the contact tips of layered connecting terminals are pressed down to prevent mis-touch and wear-out while distinct specification memory card is inserted.

SUMMARY OF THE INVENTION

This invention is a novel structure for an all-in-one memory card socket. The primary object of the invention is to provide a card-reading socket to accept the insertion of multiple memory cards, in which a pivot base and structure of a slide are provided to prevent mis-touch and wear-out while distinct specification memory card is inserted into the same insertion hole.

The secondary object of the invention is to provide a card-reading socket to accept the insertion of multiple memory cards, in which a pivot base and structure of slide are utilized to enable the insertion hole provided in a layered style to accept the insertion of multiple memory cards of distinct specifications, such that multiple memory cards of distinct specifications can be inserted into the same insertion hole, and accordingly scale down the size of the all-in-one memory card socket.

Therefore, the invention not only integrates multiple card readers of distinct specifications, but also significantly scales down the size of the whole card reader, and further takes the maintenance into account in terms of the allocation of connecting terminals. All these have completely met the requisites of patent pending. The detailed descriptions as well as the technical contents of the invention shall be given with the accompanying drawings hereunder.

DETAILED DESCRIPTION OF THE PREFERRED EMBODIMENTS

Figure 1:
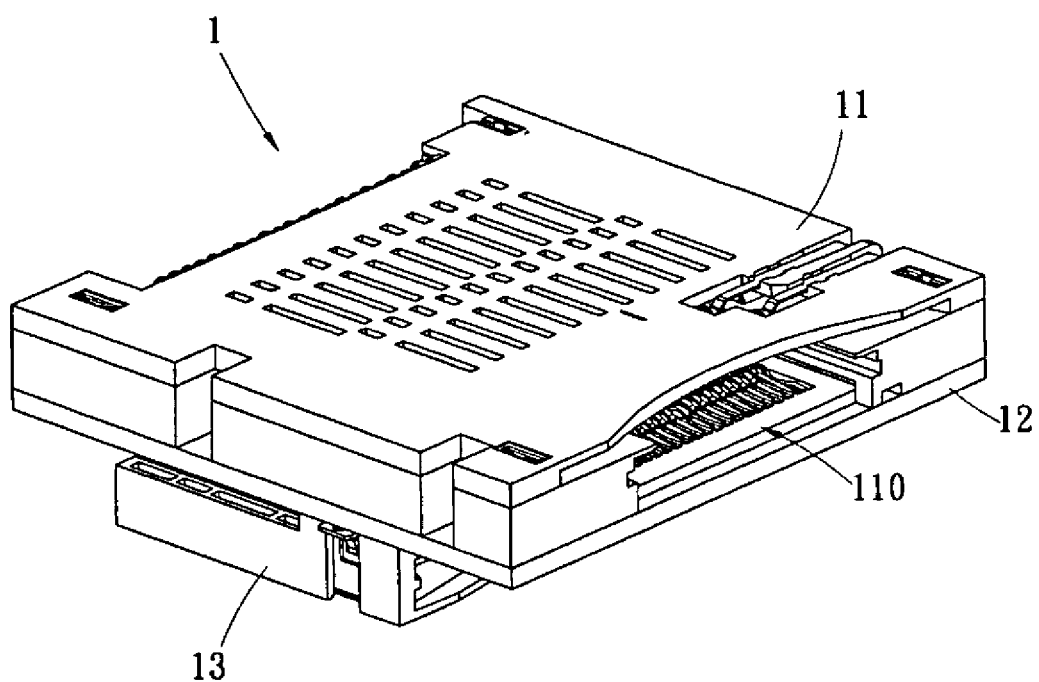
FIG. 1 shows an elevational view according to the invention.
Figure 2:
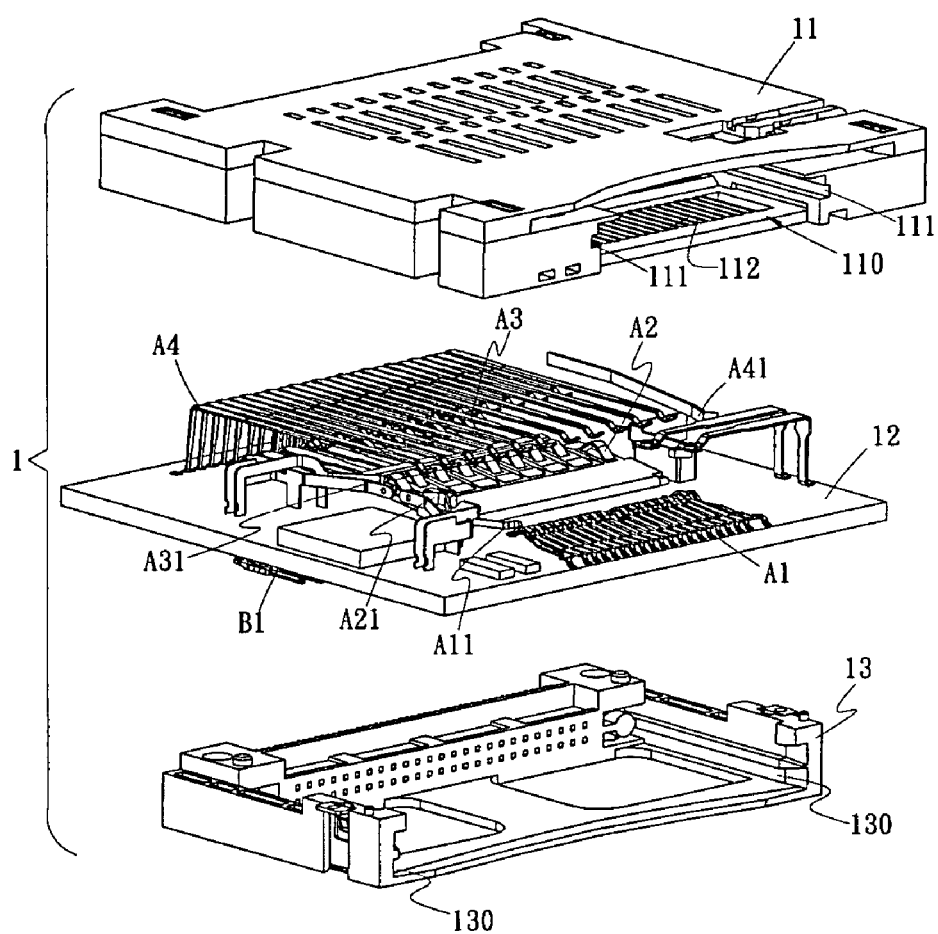
FIG. 2 shows an exploded elevational view according to the invention.

Referring to FIGS. 1 and 2, in which the card reader 1 according to the invention at least includes an upper socket 11, a base board 12, a lower socket 13, multiple start-up terminals, and multiple connecting terminals, where the base board 12 has an upper socket 11 installed on the upper side. The upper socket 11 has an insertion hole 110 at the front of its side part. Through the use of step-shaped wall face 111, it is feasible to insert distinct specification memory cards into the same insertion hole 110. The bottom side of insertion hole 110 is provided with multiple through slots 112 such that the connecting terminals can extend through and make contact with the memory card to establish a connection.

The metal terminals welded on the base board 12 can be classified as connecting terminals and start-up terminals, in which the connecting terminals are used for contacting and connecting to the memory card in order to transfer files, whereas the start-up terminals are used for start-up control when a distinct specification memory card is inserted. However, to meet the necessity of distinct specifications, the connecting terminals A1 are provided at the edge of base board 12, and an A11 start-up terminal is installed at one side to control the start-up when a memory card of A10 specification is inserted, in which the connecting terminals A1 are pressed to form steps with one end provided as a weld part and another end bent to protrude and contact memory card A10 with contact tip A12 (as shown in FIG. 5).

Figure 5:
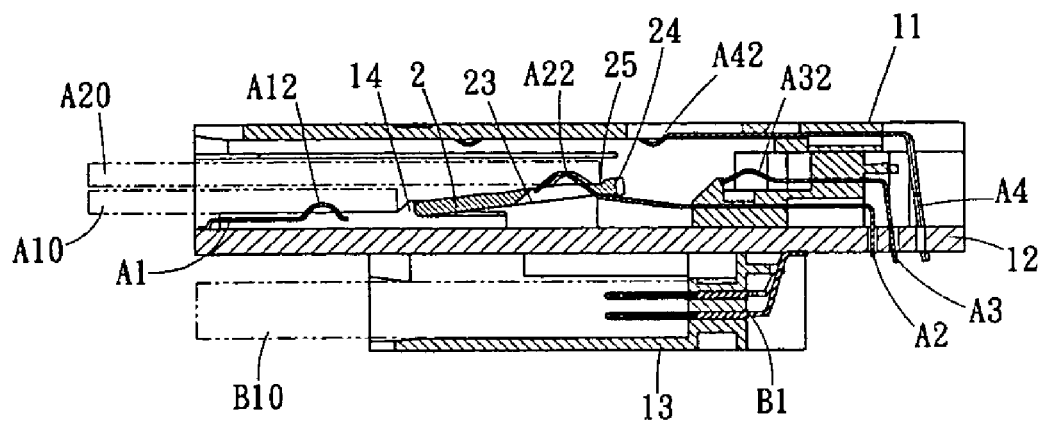
FIG. 5 shows the first sectional view when memory card is embedded in the invention.
Figure 6:
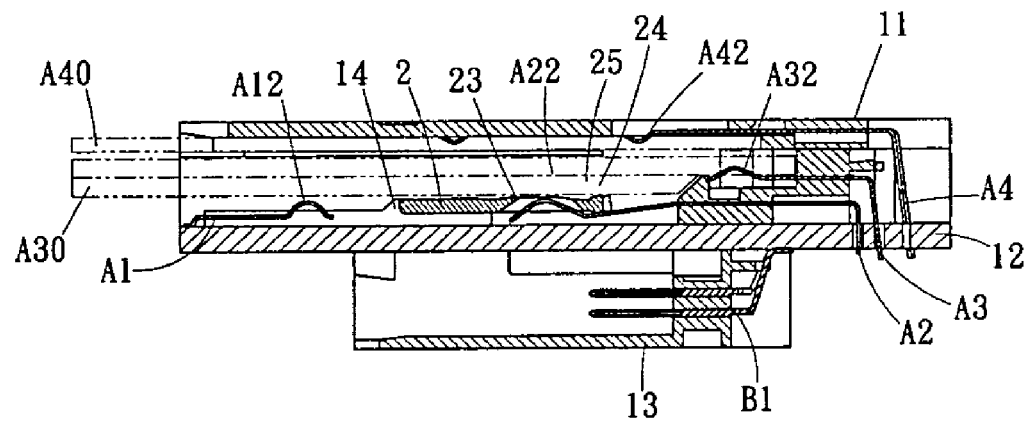
FIG. 6 shows the second sectional view when memory card is embedded in the invention.

Further, at the rear part of base board 12, connecting terminals A2 as well as a corresponding start-up terminal A21 are provided to support the insertion and connection of a memory card with an A20 specification (as shown in FIG. 5), the connecting terminals A2 being bent to be right-angled, and the end connecting to memory card A20 protruding to form a horizontal curve to provide an upward resilience. In addition, at the backside of connecting terminals A2, connecting terminals A3 and connecting terminals A4 are sequentially provided in a layered style. Also, at the side part of connecting terminals A3 and A4, start-up terminals A31 and A41 are provided to respectively support the insertion of memory card A30 and A40 as well as connection of contact tips A32 and A42 (as shown in FIG. 6). Moreover, below the base board 12, connecting terminals B1 are welded and embedded inside the lower socket 13, where associated tracks 130 are provided bilaterally at the lower socket 13 to support the insertion of memory card B10 (as shown in FIG. 5).

Since the connecting terminals A2 and A3 are installed in a layered style, the contact tips A22 precedes contact tips A32 in order to distinguish the connecting location of distinct specification memory cards. However, connecting terminals A2 and A3 are located in the same track, so that as memory card A30 is inserted to connect to the connecting terminals A3 located behind, it is inevitable that memory card A30 touches the contact tips A22 of connecting terminals A2 firstly. As the power of memory card is supplied from the main unit side, a mis-touch will cause a short-circuit and destruction of the memory card or main unit side.

Figure 3:
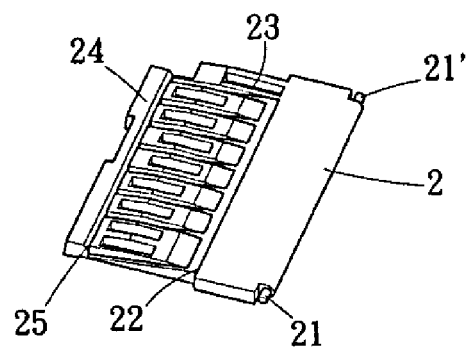
FIG. 3 shows an elevational view of the read-protected slide according to the invention.
Figure 4:
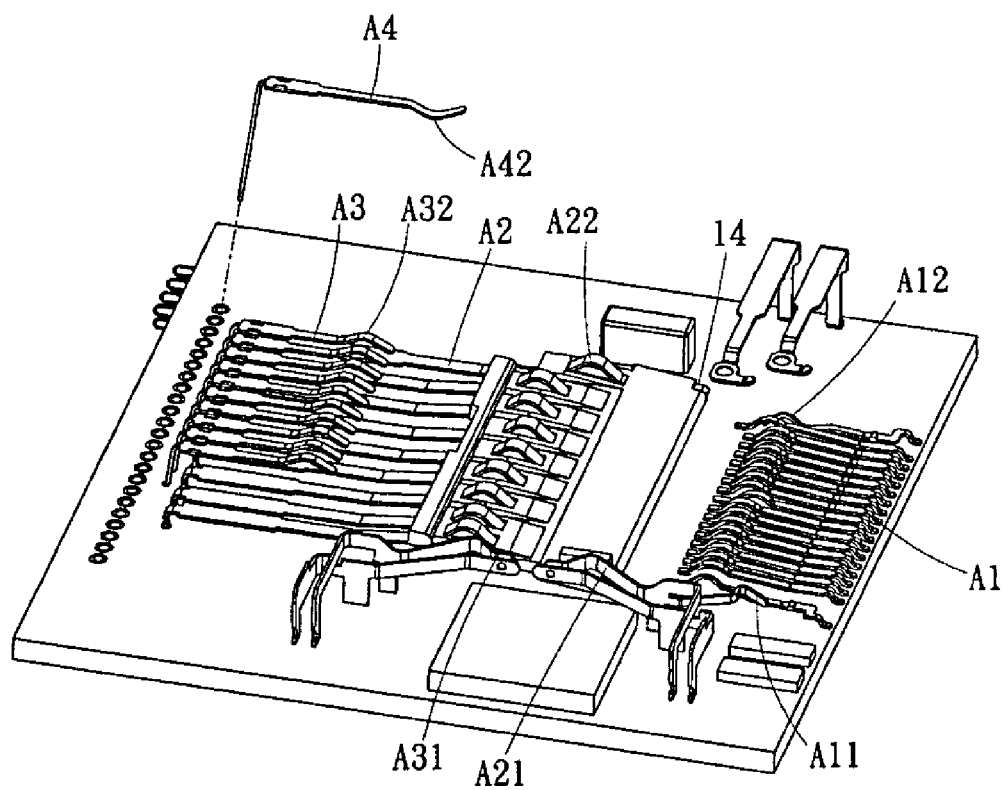
FIG. 4 shows an elevational view of the base board according to the invention.

Therefore, referring to FIGS. 3 and 4, the inventor provides a blocking device at the contact tips A22 of connecting terminals A2, which includes: a pair of pivot bases 14 provided at base board 12, a rotary blocking slide 2 is provided between the two pivot bases 14, and both sides of the blocking slide 2 have corresponding pivot connecting parts 21 and 21' in order to be embedded into the corresponding pivot base 14 and serve as the axis when the whole read-protected slide 23 rotates.

In addition, as shown in FIG. 3, a step 22, multiple through slots 23, and a horizontal pressing rod 24 are sequentially formed in the blocking slide 2, and a front resist part 25 is formed between the horizontal pressing rod 24 and through slots 23 in order to locate memory card A20 during insertion. The amount of through slots 23 corresponds to the amount of connecting terminals A2. Also, through slots 23 enable the contact tips A22 of connecting terminals A2 to extend through the slide. By way of the elasticity provided by the metal material of connecting terminals A2, one end of the read-protected slide 2 is raised and thus locates the memory card when memory card A20 is inserted.

Referring to FIG. 6, during insertion of a memory card with A30 specification, as the thickness and length of memory card A30 are larger than those of memory card A20, the memory card A30 will press down the read-protected slide 2, and the read-protected slide 2 will take the end of pivot base 14 as an axis to press down the horizontal pressing rod 24 located at a far side, so that the contact tips A22 of connecting terminals A2 are pressed down and stored inside through slot 23, thereby avoiding mis-touch between memory card A30 and connecting terminals A2, as well as wear-out of contact tips A22 during insertion.

Through the structural design of the blocking device, multiple memory cards of distinct specifications can share one insertion hole, the whole size is correspondingly reduced, and it is thus becomes convenient for the relevant manufacturers to embed the present invention into their products.

What is claimed is:

1. An all-in-one memory card socket arranged to receive multiple memory cards, comprising a read-protect device which includes:
    a pair of pivot bases situated on a base board for supporting a blocking slide said blocking slide being pivotally mounted to said pivot bases by two axles;
    wherein said blocking slide engages contact tips of connecting terminals to cause, by way of the elasticity provide by the metal material of the connecting terminals, one end of the blocking slide to be raised and thereby position a first memory card relative to said contact tips and prevent an end of the first memory from being pushed past the blocking slide, and
    wherein, when a second memory card thicker than said first memory card is inserted, the second memory card presses down the contact tips of said connecting terminals and to release said blocking slide, enabling the blocking slide to pivot and permit passage of an end of the second memory card past the blocking slide.

2. The all-in-one memory card socket in accordance with claim 1, wherein the connecting terminals are layered on the base board and the contact tips are arranged at different positions, such that an insertion hole can accept the insertion of multiple memory cards of distinct specifications and thus decrease the size of the whole socket.

3. The all-in-one memory card socket in accordance with claim 1, wherein the connecting terminals are formed to be right-angled, and the contact tips extend horizontally and are elastic.

4. The all-in-one memory card socket in accordance with claim 1, wherein said blocking slide includes a plurality of slots through which said contact tips extend to engage terminals on said first memory card, and wherein when said blocking slide is pivoted to permit passage of said second memory card, said contact tips are stored inside said slots to prevent contact with terminals on said second card.

5. The all-in-one memory card socket in accordance with claim 1, further comprising an insertion hole through which said memory cards are inserted, said insertion hole including stepped walls to permit insertion of cards having different widths and thicknesses.

* * * * *